United States Patent [19]

Buseth

[11] Patent Number: 4,597,413
[45] Date of Patent: Jul. 1, 1986

[54] COUPLING APPARATUS

[75] Inventor: Richard A. Buseth, Jackson, Mich.

[73] Assignee: Snap-Tite, Inc., Union City, Pa.

[21] Appl. No.: 743,097

[22] Filed: Jun. 10, 1985

[51] Int. Cl.[4] ............................................. F16L 37/22
[52] U.S. Cl. .............................. 137/614.04; 285/224; 285/266
[58] Field of Search ............... 137/614.02, 614.03, 137/614.04; 285/122, 224, 262, 266

[56] References Cited

U.S. PATENT DOCUMENTS

| | | | |
|---|---|---|---|
| 2,477,762 | 8/1949 | Monroe | 285/266 |
| 2,666,656 | 1/1954 | Brunig | 137/614.04 X |
| 2,985,467 | 5/1961 | Cable, Jr. et al. | 285/262 X |
| 3,508,580 | 4/1970 | Snyder, Jr. | 137/614.04 |
| 3,594,019 | 7/1971 | Gotschall et al. | 285/14 |
| 3,645,294 | 2/1972 | Albread | 137/614.04 |
| 3,750,703 | 8/1973 | Arita | 137/614.04 |
| 4,077,433 | 3/1978 | Maldavs | 137/614.04 |

*Primary Examiner*—A. Michael Chambers
*Assistant Examiner*—John C. Fox
*Attorney, Agent, or Firm*—Woodling, Krost, Rust

[57] ABSTRACT

A coupling apparatus having a male member and a female member. The male member includes a flow passage having radially extending ports and a valve means. The female member includes a body member having an interior surface and a flow passage, a socket member having an exterior surface and a flow passage, and, an insert member having a first complementary surface and a second complementary surface. The valve means of said male member allows communication between said radially extending ports and said flow passage of said socket member. The interior surface of said body member is engaged in sliding contact with said first complementary surface of said insert member thus permitting universal movement of said insert member relative to said body member. The exterior surface of said socket member is engaged in sliding contact with the second complementary surface of said insert member thus permitting radial movement of said socket member relative to said insert member. The radial movement of said socket member and the universal movement of said socket member, in combination, absorb angular and radial misalignment of said male member and said female member during engagement.

18 Claims, 5 Drawing Figures

COUPLING APPARATUS

The coupling apparatus, which is fully disclosed herein, has as its primary purpose the transfer of material from one place to another. The coupling apparatus accomplishes the transfer of material through engagement of a male member and a female member. The design of the coupling apparatus permits angular and radial misalignment of the male member relative to the female member during engagement. The coupling apparatus is versatile and can be used to transfer various liquid and gaseous materials.

The coupling apparatus disclosed herein is superior to the prior art in that angular and radial misalignment of the male and female members with respect to each other can be tolerated. The prior art found in U.S. Pat. No. 3,750,703 provides for radial misalignment, but not angular misalignment. U.S. Pat. No. 3,750,703 provides for radial misalignment through use of a bellows in its female member. The present invention is far superior to the prior art and is described in detail below.

The preferred embodiment, described herein, has a male member and a female member operatively and engagingly associated therewith. The male member is comprised of several component members forming, essentially, a flow passage. The female member is comprised of several component members forming: a socket member having a flow passage and an exterior surface; a first insert member having complementary surfaces; a second insert member having complementary surfaces; and, a body member having a flow passage, a first interior surface, and a second interior surface.

The male member of the coupling apparatus is, in general terms, a probe. The stationary male member is engaged with the movably approaching female member to transfer materials from the male member to the female member. It is important to note that the coupling apparatus is also capable of transferring material from the female member to the male member. During engagement, the flow passage of the male member is opened to permit passage of material between the male member and the female member. The opening of the flow passage of the male member is fully described below.

The male member of the preferred embodiment is comprised of a first body member having an annularly-shaped flow passage, a valve member having a flow passage, a second body member, a valve sleeve and valve sleeve spring, a casing and a casing spring, and several sealing means. The first body member is, essentially, an adaptor which allows various connection means to mate with the male member thus providing a source of material supply. The first body member has an annularly-shaped flow passage which, in turn, is connected to the flow passage of the valve member. The first body member and the valve member are connected by thread means. The flow passage of the valve member is generally annularly shaped, except for a portion of the passage which is comprised of cylindrically-shaped, radially extending ports. The preferred embodiment has four cylindrically-shaped, radially extending ports, located at right angles with respect to one another. The four radial ports have been found capable of accommodating the flow requirements of most applications. The applicability and versatility of this invention is virtually unlimited and, therefore, certain situations may require modification of the flow passage and, in particular, modification of the shape and number of the radially extending ports disclosed in the preferred embodiment.

The four cylindrically-shaped, radially extending ports located in the valve are closed-off, or shut, by the valve sleeve during disengagement of the male and female members. The valve sleeve resides primarily in sliding contact with the valve and the first body member and is retained in position by the valve sleeve spring during disengagement of the male and female members. During engagement, however, the valve sleeve opens the radially extending ports and allows material to pass from the male member to the female member. The opening of the valve ports occurs when the valve sleeve is forced against the valve sleeve spring. The valve sleeve movement is created by movement of the casing. During engagement, the male member approaches the female member which is stationary. It makes no difference in the functional operation of the invention if the female member movingly approaches a stationary male member. Once engagement has progressed sufficiently, the casing of the male member intercepts the socket member of the female member thereby causing movement of the casing, and hence, the valve sleeve. The male and female members do not have to be perfectly aligned for interception of the casing and said socket member to occur. In fact, in most applications of the coupling apparatus, misalignment of said male and said female member will occur during and prior to engagement. Misalignment does not degrade the effectiveness of the invention.

The effectiveness of the coupling apparatus is primarily due to the design of the female member which is discussed in detail below. However, the effectiveness is also partially due to the design of the male member. The valve member, valve sleeve member, and valve casing member of said male member are shaped in a manner that complements the shape of the socket member of the female member. The complementary shapes aid in preventing material leaks during engagement of the male and female members. The importance of the male member and its surfaces will be discussed below in greater detail.

During disengagement, the casing is retained in position by the casing spring which resides primarily between the casing and the first body member. Engagement of the male and female members, however, causes the casing to move against the casing spring thereby compressing it. The movement of the casing, in turn, causes the valve sleeve to open the flow passage of the valve thereby permitting material passage.

The casing resides primarily in sliding contact with the valve, the valve sleeve, and the second body member. The second body member is connected by thread means to the first body member. The second body member provides a surface for the casing to reside upon. The second body member also serves as a shield and excludes undesirable materials from entering the male member.

The second body member of the male member has thread means and a flange on its exterior. The flange and thread means are employed for mounting the male member in position on, perhaps, a larger device. The flange and thread means of the preferred embodiment are not absolutely necessary to successful practice of the invention.

The female member is comprised of several component members including a socket member having a flow passage, a first insert member having complementary surfaces, a second insert member having complementary surfaces and a body member having a flow passage. Understanding the operation of the female member is essential to understanding the invention disclosed herein.

The female member of the coupling apparatus is, in general terms, a receptacle for the male member. However, the female member may be the approaching member rather than the stationary or receiving member. Therefore, description of the female member as a receptacle may be less appropriate when the female member approaches the male member.

The socket member of the female member contacts the male member during engagement. The socket member has a flow passage and an exterior surface. The socket member of the preferred embodiment is comprised of several component members: an adaptor, a valve, a valve spring, a cartridge having apertures, and several sealing means. The adaptor has an annularly-shaped interior open at both ends. The adaptor also has an exterior surface with thread means and a flange. The valve is primarily cylindrically-shaped and open at both ends. The valve resides in contact with the adaptor and the cartridge during disengagement of the male and female members. The valve is retained in place during disengagement of the male and female members by a valve spring.

The interior surface of the cartridge is, in general, annularly-shaped and open at both ends. The interior surface of the cartridge has thread means which connect the adaptor and the cartridge. Radially-extending ports are located in the cartridge which form a flow passage. The cartridge also has an exterior surface that is generally annularly-shaped, except for a portion of said exterior which is in the shape of a flange.

During disengagement of the male and female members, the flow passage of said socket member is closed-off or shut. The valve of the male member intercepts the valve of the female member during engagement thus opening the flow passage of the socket member. During engagement, the valve spring of the socket member is compressed as the flow passage is opened. Once the valve has been opened, flow through the socket member commences.

The socket member has two flanges: one on the adaptor and one on the cartridge. The two flanges reside in sliding contact with the insert members. The insert members have complementary surfaces. The body member has a first interior surface in sliding contact with the first insert member and a second interior surface in sliding contact with the second insert member. The first insert member has a first complementary surface in sliding contact with the first interior surface of the body member and a second complementary surface in sliding contact with the exterior surface on said cartridge flange. The second insert member has a first complementary surface in sliding contact with the second interior surface of the body member and a second complementary surface in sliding contact with the exterior surface on said adaptor flange. It is important to note that the insert members are generally circularly-shaped and in the form of a ring. The second complementary surfaces of the first and second insert members, in combination with the flanges of said adaptor and said cartridge, permit radial movement of the socket member relative to the insert member during engagement of the male and female member. The first complementary surfaces of the first and second insert members, in combination with first and second interior surfaces of the body member, permit universal movement of the insert members relative to the body member. The radial movement of the socket member and the universal movement of the insert member, in combination, absorb angular and radial misalignment of the male and female members during engagement.

The preferred embodiment employs first complementary surfaces having a spherical shape. Necessarily, the first and second interior surfaces are spherically shaped. The spherical shape is employed in the preferred embodiment because it has been found to provide universal movement. Other surface shapes may, of course, be employed in other embodiments of the invention although less than universal movement may occur.

The body member of the female member has a flow passage similar to that located in the first body member of the male member. The body member of the female member serves as a housing member for all other female member components. The preferred embodiment provides for mounting of the body member by thread means to another, probably larger, device. That device would be stationary if the male member approaches the female member. If the female member approaches a stationary male member, that device could propel the female member towards the male member until engagement occurs. A third situation could arise wherein the male and female members are mutually driven towards one another.

The body member of the female member has a flow passage similar to that located in the first body member of the male member in that it can be easily adapted to receive material from several different sources of supply. The flow passage of the body member of the female member is annularly-shaped and is connected to the flow passage of the socket member.

Two wipers, a first wiper member and a second wiper member, are attached to said body member of said female member. The wipers are generally circularly shaped and are flexible. The first wiper member resides in sliding contact with the flanged portion of the cartridge member. The second wiper member resides in sliding contact with the flanged portion of the adaptor. The first and second wiper members serve as a sealing means to keep dirt and other undesirable materials outside the female member.

A more complete understanding of the coupling apparatus and its uses may be had by referring to the following description and claims in conjunction with the accompanying drawings in which:

Figure 1:
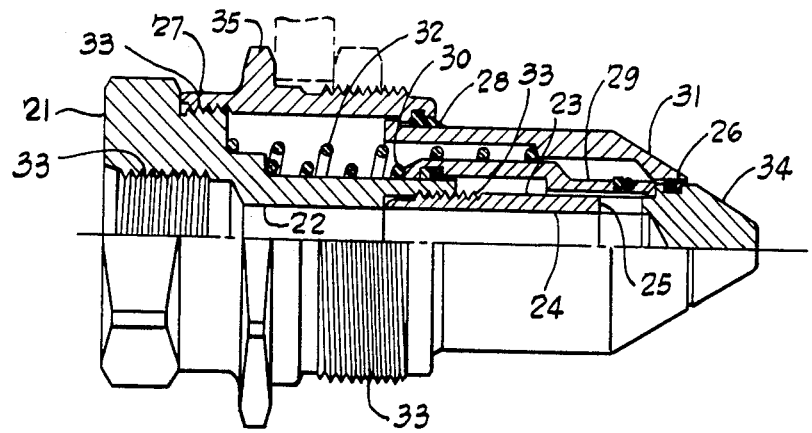
FIG. 1 is a sectional side view of the male member of the coupling apparatus.

FIG. 1 is the preferred embodiment of the male member of the coupling apparatus. FIG. 1 shows the constituent parts of the male member. FIG. 1 shows the male member having a first body member 21 which, in turn, has an annularly-shaped flow passage 22. Also shown are the valve member 23 having a first flow passage 24 and a second flow passage 25, the valve sleeve 29 and the valve sleeve spring 30, the casing 31 and the casing spring 32, and, the second body member 27 and its wiper 28.

The first body member 21 is connected to the valve member 23 by thread means 33. The first body member 21 has a flow passage 22 located inside the first body member 21 that, when connected to said flow passages 24,25 of the valve member 23, provides a continuous path for material transfer. Material transfer, as previously indicated, means movement of a fluid or gaseous material, or a combination thereof. The continuous path comprised of the flow passage 22 and the flow passages 24,25 is closed-off when the valve sleeve 29 blocks the flow passage 24. This blocking or closing-off the flow passage 24 occurs when the male member is disengaged from said female member. However, when the male and female members are engaged, the flow passages 22, 24, 25 permit passage of material.

During engagement, the valve 23 and said casing 31 intercept the female member. Upon contact with the female member, the casing 31 begins to slide upon the valve 23 and said valve sleeve 29. Once the casing 31 has moved far enough, it, due to its shape, causes the valve sleeve 29 to begin sliding on the valve 23 and the first body member 21. When the valve sleeve 29 has moved far enough, the flow passages 22,24,25 are opened to permit material transfer to or from the male member. The movement of the casing 31 and the valve sleeve 29 is resisted, respectively, by the casing spring 32 and the valve sleeve spring 30. Essentially, the casing 31 acts as a sleeve on the valve sleeve 29 and retracts the valve sleeve 29, allowing the flow passages 22,24,25 to open. As stated above, movement of the casing 31 and the valve sleeve 29 is resisted by the casing spring 32 and the valve sleeve spring 30. The casing spring 32 and the valve sleeve spring 30 are metal coil springs. Other embodiments may employ different spring means and materials.

The opening of the flow passages 22,24,25 is enhanced by the shape of the components that comprise the male member. The valve 23 is in the shape of a truncated cone. Put another way, the valve 23 does not have a cone "tip". The casing 31 has a surface which, in part, matches the conical shape of the valve 23. The conical shape of the valve 23 and the casing 31 are used in the preferred embodiment as they have been found to produce the best performance for engaging the female member. In fact, the shape of the valve 23 and the casing 31 complement the shape of the female member shown in FIG. 2.

The second body member 27 of the male member functions primarily as a housing for the male member. The first body member 21 and the second body member 27 are connected by thread means 33. The second body member 27 of the preferred embodiment has a flange 35 which, in combination with thread means 33, can be used to mount the male member on another device. The second body member 27 has an interior surface upon which the casing 31 resides in sliding contact with during engagement and in stationary contact with when disengaged. The second body member 27 has a wiper means 28 attached thereto to eliminate or minimize the amount of undesirable material entering the male member.

Figure 3:
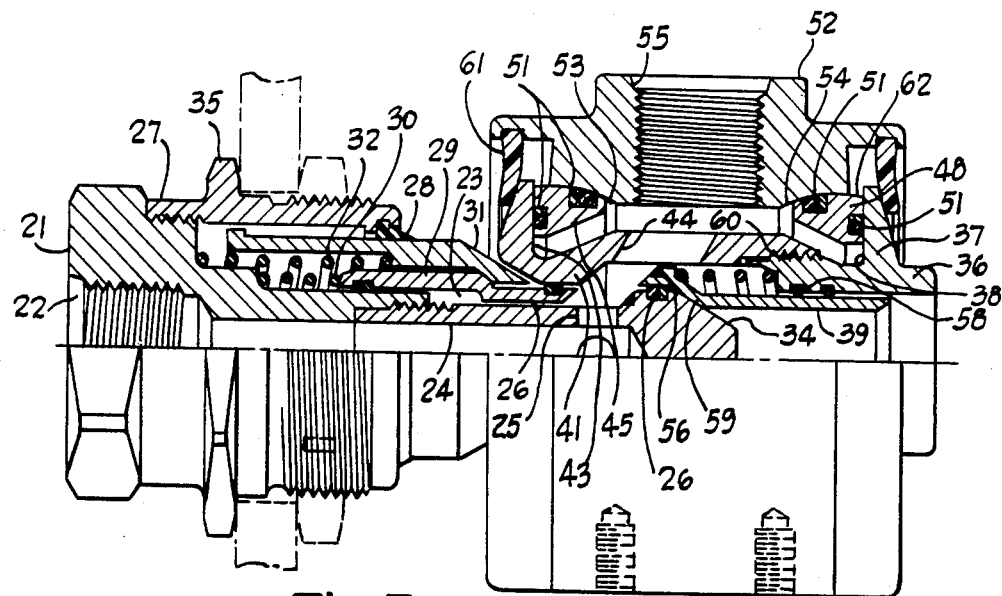
FIG. 3 is a sectional side view of the male and female member in engagement.

A better understanding of the male member's operation can be had by referring to FIG. 3, a sectional side view of the male and female members during engagement. FIG. 3 shows the flow passages 22,24,25 in the open position. Flow passage 25 of the valve member 23 is comprised of four radially extending flow ports located at right angles with respect to one another. Four radially extending ports are used in the preferred embodiment because they are capable of supplying enough flow capacity for most applications of the coupling apparatus. FIG. 3 also shows the casing 31 and the valve sleeve 29 in retracted position. Correspondingly, the valve sleeve spring 30 and the casing spring 32 are shown in FIG. 3 in their compressed states or positions.

FIG. 3 illustrates the need for, and use of, the sealing means 26 located on the valve member 23, the valve sleeve 29 and the first body member 21. The sealing means 26 of the preferred embodiment assist in minimizing leakage of material during engagement of the male and female member. The sealing means 26 of the preferred embodiment is made of a rubber-based material as that has proven to minimize leakage of material.

FIG. 3 also illustrates the use of, and need for, the wiper member 28. The wiper member 28 prevents, to the extent possible, infiltration of undesirable materials into the male member. The wiper 28 of the preferred embodiment is made of urethane as that material has been found to supply the rigidity required to "wipe" unwanted and undesirable material away.

Figure 2:
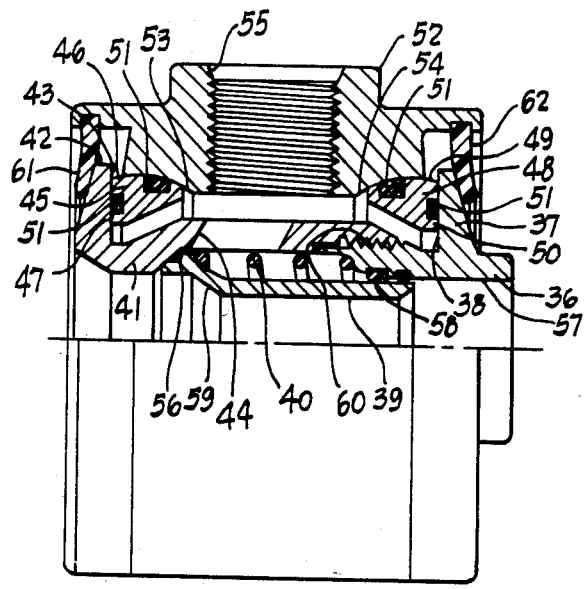
FIG. 2 is a sectional side view of the female member of the coupling apparatus.

FIG. 2 shows the female member. A major constituent of the female member is the socket member 63. FIG. 2 also shows the first insert member 45 having a first complementary surface 46 and a second complementary surface 47, a second insert member 48 having a first complementary surface 49 and a second complementary surface 50. In addition, FIG. 2 shows the body member 52 having a first interior surface 58, a second interior surface 54, and a flow passage 55.

Figure 5:
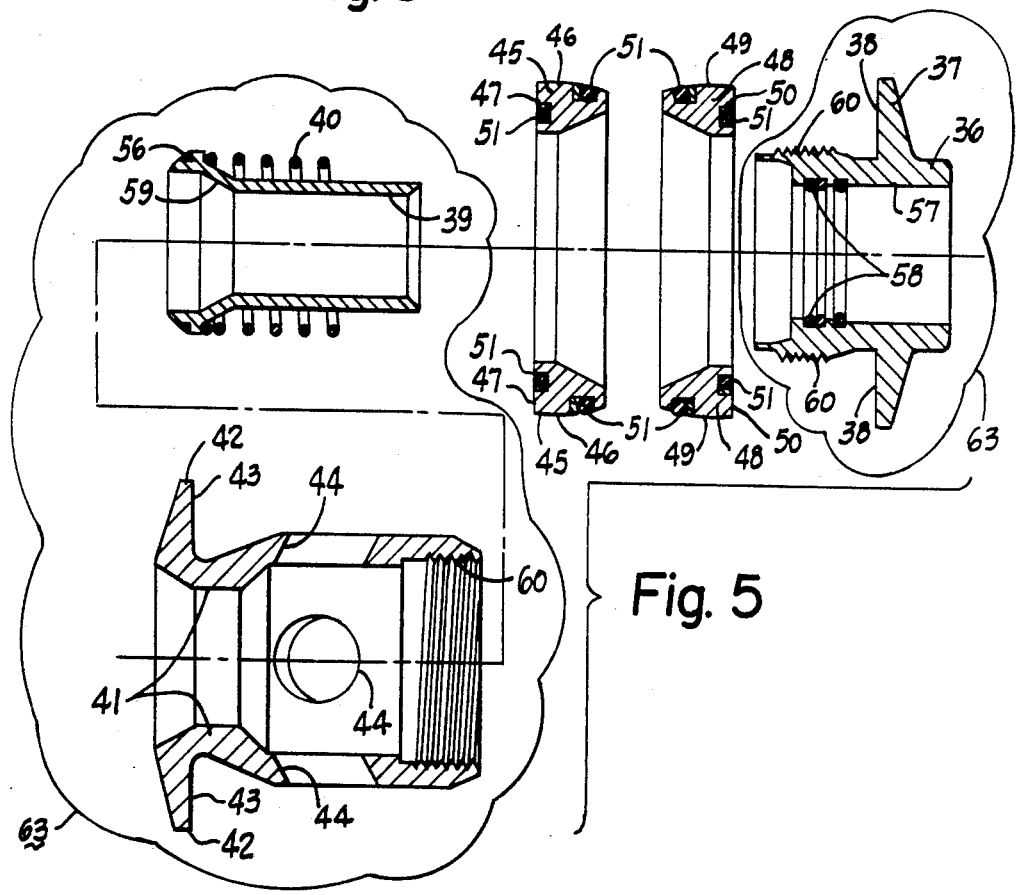
FIG. 5 is a side view of the socket member and the insert members.

The socket member 63 shown in FIG. 5 is comprised of an adaptor 36 having a flange 37, a valve 39 having a sealing means 56 and residing within the adaptor 36, a valve spring 40 opposing movement of the valve 39, and, a cartridge 41 having a flange 42 and ports 44. The adaptor 36 has an annularly-shaped interior 57 and is open-ended so as to provide an outlet for undesirable materials that may accumulate during operation of the coupling apparatus. The undesirable materials will be forced out the adaptor 36 when the male member (FIG. 1) is engaged with the female member (FIG. 2). The valve 39 is located in sliding contact with the adaptor 36 during engagement. The valve 39 contacts the valve 23 of the male member during engagement. Valve 39 is thrust away from the cartridge 41 and the valve spring 40 is compressed when the male member (FIG. 1) and the female cylindrically-shaped except the end portion 59 which has a shape complementary to that of the end portion 34 of said valve member 23 of the male member. FIG. 3 shows the end portion 34 of the valve member 23 engaged and contacting the end portion 59 of the valve 39.

It can be readily seen from FIG. 2 that, during disengagement or separation, the valve 39 is in contact with the cartridge 41. Sealing means 56 prevent undesirable materials from entering the socket member 63 and fouling or clogging the apertures 44 of the cartridge 41.

The cartridge 41 has, in general, an annularly-shaped interior and is connected to the adaptor 36 by thread means 60. Said cartridge 41 has a flange 42 that functions similarly to the flange 37 on the adaptor 36 when the socket member engages with the male member. Four radially extending ports 44 are located in the cartridge 41. The female member behaves much like the male member in that, during disengagement, the valve 23 and the valve 39 are closed-off, or shut, and will not permit flow of material through their respective members. It is only during engagement that the valve 23 and valve 39 mutually open to permit transfer of material. Valves 23 and 39 can be readily seen in their retracted position in FIG. 3. The four radially extending ports comprising the flow passage 25 of the male member communicate material through the four radially extending ports 44 located in said cartridge 41 during engagement.

The cartridge 41 and the adaptor 36 have flanges 42 and 37 located thereon, respectively. The flange 42 located on the cartridge 41 has an interior cartridge flange surface 43. In a similar fashion, the flange 37 located on the adaptor 36 has an interior adaptor flange surface 38. The interior cartridge flange surface 43 is circularly-shaped and flat as is the adaptor flange surface 38.

The first insert member 45 is generally circularly-shaped and has a first complementary surface 46 and a second complementary surface 47. The interior cartridge flange surface 43 is in sliding contact with the second complementary surface 47. Correspondingly, the interior adaptor flange surface 38 is in sliding contact with the second complementary surface 50 of the second insert member 48. The sliding action between the flange surfaces 43,38 and the second complementary surfaces 47,50 permit radial movement of the socket member relative to the first insert member 45 and the second insert member 48, respectively. To provide sealing between the flange surfaces 43,38 and the second complementary surfaces 47 and 50, rubber-based sealing means 51 are located therebetween.

Radial movement of the socket member relative to said first insert member 45 and the second insert member 48 can, and most likely will, occur during use of the coupling apparatus. For instance, FIG. 3 shows the male member perfectly aligned with the female member in the engaged position. If the male and female member were radially out of alignment with respect to one another, however, then the socket member would be shifted by the amount of misalignment within the physical constraints of the coupling apparatus. Another view of the coupling apparatus can be had from FIG. 4, a sectional side view of the female member showing portions of the socket member 63, the first insert member 45, and the body member 52. It can be readily seen from FIG. 4 that the cartridge member 41 can move relative to the first insert member 45, the only constraint being the physical dimensions of the female member.

Body member 52 serves as the housing for the female member, but it also has other features, namely, a first interior surface 53, a second interior surface 54, and a flow passage, that make it an extremely important component of the invention. The first interior surface 53 and second interior surface 54 are spherically-shaped in the preferred embodiment. The first complementary surface 46 of the first insert member 45 is, necessarily, spherically-shaped except for the sealing means 51. Likewise, first complementary surface 49 of the second insert member 48 is generally spherically shaped. The preferred embodiment employs the spherically-shaped surface because they provide for universal movement of the first insert member 45 and the second insert member 48 relative to the body member 52. Other embodiments may well employ insert members having complementary surfaces of different shapes and character. For instance, the preferred embodiment employs steel insert members 45 and 48. Other embodiments may use plastic insert members having a circular surface. Sealing means 51 exist between the first and second interior surfaces 53,54 and the first complementary surfaces 46,49 to prevent leakage of the material.

Figure 4:
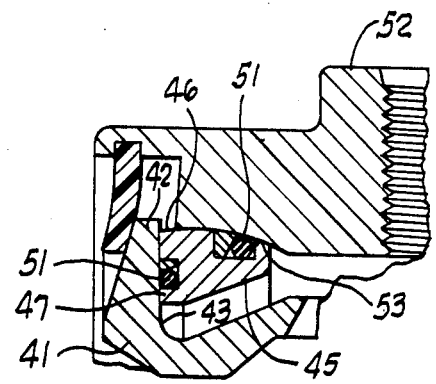
FIG. 4 is a sectional side view of the female member showing portions of the socket member, the first insert member, and the body member.

A better appreciation for, and understanding of, the universal movement of the insert member 45 relative to the interior surface 53 can be had through inspection of FIG. 4. FIG. 4 shows portions of the socket member 63, the first insert member 45, and the body member 52. Universal movement of the insert member 45 is precipitated by the socket member. It can be readily seen from FIG. 4 that any change in angular orientation of the socket member 63 will result in universal movement of the insert member 45 relative to the body member 52.

The radial movement of the socket member 63 relative to the insert members 45,48 absorbs radial misalignment of said male and female member during engagement. The radial misalignment may be on any axis and can vary in magnitude from none to a maximum as determined by the dimensions of the coupling apparatus used. In a similar fashion, the universal movement of the insert members 45,48 relative to the surfaces 53,54 of the body member 52, absorb angular misalignment of the male and female member during engagement. The angular misalignment can vary in magnitude from none to a maximum determined by the size of the coupling apparatus and can be in any direction.

The preferred embodiment also employs a first wiper 61 attached to the body member 52 and residing in sliding contact with the cartridge flange 42. A second wiper 62 is attached to the body member 52 and is in sliding contact with the adaptor flange 37. The first and second wipers 61, 62 are used to minimize the amount of undesirable material, such as dirt, from entering the female member.

It is important to observe that the preferred embodiment of the coupling apparatus employs a variety of materials for its component parts. Carbon steel and stainless steel are used in the male member except for the sealing means which uses rubber and the wiper which uses urethane. Carbon steel and stainless steel are also used in the female member except for the wipers 61,62 and the sealing means 51,56 which use nitrile or teflon.

Although the preferred embodiment of this invention has been described with specificity, it is understood that the present disclosure of the preferred embodiment is by way of example only and that numerous changes may be made to its construction and arrangement without deviating from the spirit and scope of the invention as hereinafter claimed.

What is claimed is:

1. A coupling apparatus comprising a male member having a flow passage and a female member, said female member including a body member having an interior surface and a flow passage, a socket member having an exterior surface and a flow passage, an insert member having a first complementary surface and a second complementary surface, said first complementary surface engaged in sliding contact with said interior surface of said body member permitting universal movement of said insert member relative to said body member, said second complementary surface of said insert member engaged in sliding contact with said exterior surface of said socket member permitting radial movement of said socket member relative to said insert member, said radial movment of said socket member and said universal movement of said insert member, in combination, absorb angular and radial misalignment of said male member and said female member during engagement.

2. An apparatus as claimed in claim 1 wherein a check valve is located in said flow passage of said male member.

3. An apparatus as claimed in claim 1 wherein a check valve is located in said flow passage of said body member of said female member.

4. An apparatus as claimed in claim 1 wherein a wiper is connected to said body of said female member and is engaged in sliding contact with said exterior of said socket member to prevent intrusion of undesirable materials into said female member.

5. A coupling apparatus comprising a male member having a flow passage and a female member, said female member including a body member having a spherically-shaped interior surface and a flow passage, a socket member having an exterior surface and a flow passage, an insert member having a first complementary surface and a second complementary surface, said first complementary surface engaged in sliding contact with said spherically-shaped interior surface of said body member permitting universal movement of said insert member relative to said body member, said second complementary surface of said insert member engaged in sliding contact with said exterior surface of said socket member permitting radial movement of said socket member relative to said insert member, said radial movement of said socket member and said universal movement of said insert member, in combination, absorb angular and radial misalignment of said male member and said female member during engagement.

6. An apparatus as claimed in claim 5 wherein said first complementary surface of said insert member of said female member is spherically-shaped.

7. A coupling apparatus comprising a male member having a flow passage and a female member, said female member including a body member having a spherically-shaped interior surface and a flow passage, an insert member having a first spherically-shaped complementary surface and a second flat complementary surface, a socket member having an engagement flange and a flow passage, said engagement flange having a flat surface in sliding contact with said second flat complementary surface of said insert member permitting radial movement of said socket member relative to said insert member, said first spherically-shaped complementary surface of said insert member in sliding contact with said spherically-shaped interior surface of said body member permitting universal movement of said insert member relative to said body member, said universal movement of said insert member and said radial movement of said socket member, in combination, absorb angular and radial misalignment of said male member and said female member during misalignment.

8. A coupling apparatus comprising a male member having a flow passage and a female member, said female member including a body member having a uniformly curved interior surface and a flow passage, a socket member having an exterior surface and a flow passage, an insert member having a first complementary uniformly curved surface and a second complementary surface, said first complementary uniformly curved surface engaged in sliding contact with said uniformly curved interior surface permitting universal movement of said insert member relative to said body member, said second complementary surface of said insert member engaged in sliding contact with said exterior surface of said socket member permitting radial movement of said socket member relative to said insert member, said radial movement of said socket member and said universal movement of said insert member, in combination, absorb angular and radial misalignment of said male member and said female member during engagement.

9. A coupling apparatus comprising a male member having a flow passage and a female member, said female member including a body member having a first interior surface, a second interior surface and a flow passage, a socket member having a first engaging flange, a second engaging flange and a flow passage, a first insert member having a first complementary surface and a second complementary surface, a second insert member having a first complementary surface and a second complementary surface, said first complementary surfaces of said first and second insert members engaged in sliding contact with said first and second interior surfaces of said body member, respectively, permitting universal movement of said first and second insert members relative to said body member, said second complementary surfaces of said first and second insert members engaged in sliding contact with said first and second engaging flanges of said socket member, respectively, permitting radial movement of said socket member relative to said first and second insert members, said radial and said universal movement of said socket member, in combination, absorb angular and radial misalignment of said male member and said female member during engagement.

10. An apparatus as claimed in claim 9 wherein said socket member has an aperture allowing undesirable materials to exit therefrom during engagement of said male and female members.

11. A coupling apparatus comprising a male member having a flow passage and a female member, said female member including a body member having an interior surface and a flow passage, a socket member having an interior surface, an exterior surface, and a flow passage, a valve means in sliding contact with said interior surface of said socket member permitting passage of material through said flow passage of said socket member during engagement of said male and female members, an insert member having a first complementary surface and a second complementary surface, said first complementary surface engaged in sliding contact with said interior surface of said body member permitting universal movement of said insert member relative to said body member, said second complementary surface of said insert member engaged in sliding contact with said exterior surface of said socket member permitting radial movement of said socket member relative to said insert member, said radial movement of said socket member and said universal movement of said insert member, in combination, absorb angular and radial misalignment of said male member and said female member during engagement.

12. An apparatus as claimed in claim 11 wherein said body member includes a wiper in sliding contact with said exterior surface of said socket member prohibiting entrance of material onto said first and second complementary surfaces of said insert member.

13. An apparatus as claimed in claim 11 wherein said socket member includes an aperture for expelling undesirable material therefrom during engagement of said male member and said female member.

14. An apparatus as claimed in claim 11 wherein said first and said second complementary surfaces of said insert member include sealing means prohibiting leakage of material from said female member.

15. A coupling apparatus comprising a male member including a flow passage having radially extending ports and a valve means, a female member including a body member having an interior surface and a flow passage, a socket member having an exterior surface and a flow passage, and an insert member having a first complementary surface and a second complementary surface, said valve means of said male member allowing communication of said radially extending ports with said flow passage of said socket member during engagement of said male member and said female member, said first complementary surface of said insert member engaged in sliding contact with said interior surface of said body member permitting universal movement of said insert member relative to said body member, said second complementary surface of said insert member engaged in sliding contact with said exterior surface of said socket member permitting radial movement of said socket member relative to said insert member, said radial movement of said socket member and said universal movement of said insert member, in combination, absorb angular and radial misalignment of said male member and said female member during engagement.

16. An apparatus as claimed in claim 15 wherein said male member includes sealing means prohibiting leakage of material during engagement of said male and female member.

17. An apparatus as claimed in claim 15 wherein said male member includes a casing means activating said valve means during engagement of said casing means of said male member with said socket means of said female member.

18. An apparatus as claimed in claim 15 wherein said female member has a T-shaped flow passage.

* * * * *